(12) United States Patent
Kakeshita et al.

(10) Patent No.: US 12,311,924 B2
(45) Date of Patent: May 27, 2025

(54) DRIVING SUPPORT APPARATUS, DRIVING SUPPORT METHOD, AND NON-TRANSITORY COMPUTER-READABLE STORAGE MEDIUM

(71) Applicant: TOYOTA JIDOSHA KABUSHIKI KAISHA, Toyota (JP)

(72) Inventors: Mafune Kakeshita, Toyota (JP); Toshifumi Kawasaki, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 195 days.

(21) Appl. No.: 18/349,268

(22) Filed: Jul. 10, 2023

(65) Prior Publication Data

US 2024/0109535 A1 Apr. 4, 2024

(30) Foreign Application Priority Data

Sep. 30, 2022 (JP) ................................. 2022-157490

(51) Int. Cl.
*B60W 30/09* (2012.01)
*B60W 30/095* (2012.01)
*B60W 50/12* (2012.01)

(52) U.S. Cl.
CPC ........ *B60W 30/09* (2013.01); *B60W 30/0953* (2013.01); *B60W 50/12* (2013.01); *B60W 2540/10* (2013.01)

(58) Field of Classification Search
None
See application file for complete search history.

(56) References Cited

U.S. PATENT DOCUMENTS

| | | | | |
|---|---|---|---|---|
| 10,099,688 B2 * | 10/2018 | Taki | ..................... | B60W 10/20 |
| 10,691,123 B2 * | 6/2020 | Abe | ................... | B60W 50/082 |
| 10,807,594 B2 * | 10/2020 | Hatano | ............... | B60W 30/085 |
| 11,001,255 B2 | 5/2021 | Fukuman et al. | | |
| 11,014,554 B2 * | 5/2021 | Ito | ............................. | B60T 7/22 |
| 11,338,799 B2 * | 5/2022 | Ike | ........................ | B60W 30/08 |

(Continued)

FOREIGN PATENT DOCUMENTS

| | | |
|---|---|---|
| JP | 2012-121534 A | 6/2012 |
| JP | 2018-81357 A | 5/2018 |

(Continued)

*Primary Examiner* — Jonathan M Dager
(74) *Attorney, Agent, or Firm* — Sughrue Mion, PLLC

(57) ABSTRACT

A driving support apparatus comprises a sensor for detecting an object, and a controller for prohibiting a collision control when an override condition is satisfied. The controller executes the collision control in a case where the override condition is satisfied during an erroneous operation, determines that an acceleration operation is the erroneous operation in a case where a predetermined normal erroneous operation condition is satisfied, or in a case where a predetermined relaxation erroneous operation condition is satisfied when a predetermined relaxation condition is satisfied, and determines that the relaxation condition is satisfied when a number of executions of the collision control during the erroneous operation in one trip is greater than or equal to a first threshold number or when a number of determinations that the acceleration operation is the erroneous operation in one trip is greater than or equal to a second threshold number.

5 Claims, 5 Drawing Sheets

(56) References Cited

U.S. PATENT DOCUMENTS

| | | | | |
|---|---|---|---|---|
| 11,433,915 | B2* | 9/2022 | Fishwick | B60W 50/12 |
| 11,577,740 | B2* | 2/2023 | Kwon | G01C 21/3461 |
| 11,597,401 | B2* | 3/2023 | Kaminade | B60W 50/087 |
| 11,932,265 | B2* | 3/2024 | Ike | B60W 50/0098 |
| 11,975,730 | B2* | 5/2024 | Takenaka | B60W 50/12 |
| 12,187,303 | B2* | 1/2025 | Fukui | B60W 50/10 |
| 2010/0250085 | A1* | 9/2010 | Sugano | B60K 26/021 |
| | | | | 701/70 |
| 2012/0296542 | A1* | 11/2012 | Nitz | B60K 31/0008 |
| | | | | 701/70 |
| 2013/0018549 | A1* | 1/2013 | Kobana | B60K 28/06 |
| | | | | 701/41 |
| 2013/0041564 | A1* | 2/2013 | Doi | B60W 50/087 |
| | | | | 701/70 |
| 2015/0353093 | A1* | 12/2015 | Pallett | B60W 10/06 |
| | | | | 701/48 |
| 2017/0197506 | A1* | 7/2017 | Inomata | B60W 30/09 |
| 2019/0039624 | A1* | 2/2019 | Ike | B60W 50/14 |
| 2019/0315347 | A1* | 10/2019 | Ike | B60W 30/09 |
| 2020/0156642 | A1* | 5/2020 | Tochigi | B60W 10/04 |
| 2021/0061268 | A1* | 3/2021 | Ike | B60T 8/17558 |
| 2021/0155232 | A1* | 5/2021 | Ike | B60W 10/20 |
| 2021/0323542 | A1* | 10/2021 | Naka | B60K 28/00 |
| 2022/0176982 | A1* | 6/2022 | Kakeshita | B60W 30/0956 |
| 2023/0141314 | A1* | 5/2023 | Dobashi | B60W 30/143 |
| | | | | 701/23 |
| 2023/0159028 | A1* | 5/2023 | Fukui | B60W 30/0953 |
| | | | | 701/301 |
| 2023/0373472 | A1* | 11/2023 | Watanabe | B60W 30/0956 |

FOREIGN PATENT DOCUMENTS

| | | |
|---|---|---|
| JP | 2019-26129 A | 2/2019 |
| JP | 2021-079904 A | 5/2021 |

* cited by examiner

DRIVING SUPPORT APPARATUS, DRIVING SUPPORT METHOD, AND NON-TRANSITORY COMPUTER-READABLE STORAGE MEDIUM

TECHNICAL FIELD

The present disclosure relates to a driving support apparatus for prohibiting a collision control when an acceleration operation of a driver is an override operation, a driving support method for prohibiting the collision control when the acceleration operation is the override operation, and a non-transitory computer-readable storage medium storing a program for prohibiting the collision control when the acceleration operation is the override operation.

BACKGROUND

Conventionally, there has been known a driving support apparatus that executes a collision control when a possibility (a collision possibility) that a vehicle and an object collide is high. The collision control is a control for avoiding a collision between the vehicle and the object or reducing/mitigating a damage caused by the collision. An automatic brake control for decelerating the vehicle without requiring a brake operation by a driver has been known as the collision control.

A driving support apparatus described in Patent Literature 1 (hereinafter, referred to as a "conventional apparatus") prohibits the collision control when an acceleration override condition is satisfied in a case where the conventional apparatus determines that an acceleration operation by the driver is an erroneous operation. The acceleration override condition is a condition for determining that the acceleration operation is a predetermined acceleration override operation.

Patent Literature 1: Japanese Patent Application Laid-Open No. 2021-79904

SUMMARY

When an erroneous operation condition is easy to be satisfied, a detection possibility becomes high, but a misdetection becomes high. The erroneous operation condition is a condition for determining that the acceleration operation is the erroneous operation. The detection possibility is a possibility that the erroneous operation is detected. The misdetection possibility is a possibility that an intentional acceleration override operation of the driver is mis-detected as the erroneous operation. On the other hand, when the erroneous operation condition is difficult to be satisfied, the misdetection possibility becomes low, but the detection possibility becomes low.

When the conventional apparatus does not detect the erroneous operation, the conventional apparatus may mis-detect (erroneously determines) the erroneous operation as the acceleration override operation so as to prohibit the collision control. On the other hand, when the conventional mis-detects (erroneously determines) the erroneous operation, the conventional apparatus may perform the collision control even though the driver performs the acceleration override operation.

The present disclosure has been made to address the above-described problem. That is, an object of the present disclosure is to provide a driving support apparatus capable of reducing a possibility that the collision control is prohibited when the driver performs the erroneous operation and a possibility that collision control is executed when the driver performs the acceleration override operation by accurately detecting the erroneous operation.

The driving support apparatus of the present disclosure (hereinafter, referred to as "the present apparatus") comprises:

a sensor (22) configured to detect an object; and
a controller (20) configured to prohibit a collision control for avoiding a collision between a vehicle and the object or for mitigating a damage caused by the collision (step 225: No, step 245: Yes), when an override condition for determining that an acceleration operation of a driver is an override operation is satisfied, wherein,
the controller is configured to:
execute the collision control without prohibiting the collision control, in a case where the override condition is satisfied while the controller is determining that the acceleration operation is an erroneous operation;
determine that the acceleration operation is the erroneous operation, when a predetermined normal erroneous operation condition is satisfied (step 315, step 400 to 495), or when a predetermined relaxation erroneous operation condition that is easier satisfied than the normal erroneous operation condition is satisfied (step 335, step 500 to 595) and a predetermined relaxation condition is satisfied (step 325: Yes or step 330: Yes); and
determine that the relaxation condition is satisfied, when a number of executions of the collision control while the controller is determining that the acceleration operation is the erroneous operation in one trip is greater than or equal to a first threshold number (step 325: Yes) or when a number of determinations that the acceleration operation is the erroneous operation in one trip is greater than or equal to a second threshold number (step 330: Yes).

When any one of the following conditions 1 and 2 is satisfied, the present apparatus determines that the relaxation condition is satisfied so as to perform an erroneous operation determination using the relaxation erroneous operation condition that is easier to be satisfied than the normal erroneous operation condition.

Condition 1: The number of times of execution of the collision control while it is being determined that the erroneous operation is performed in one trip is equal to or greater than a first threshold number.

Condition 2: The number of times it is determined that the erroneous operation determined in one trip is equal to or greater than a second threshold number.

When the condition 1 is satisfied, the collision control is executed the first threshold number or more while it is being determined that the erroneous operation is performed. Therefore, the driver tends to perform the erroneous operation that increases the possibility of collision with the object. When the condition 2 is satisfied, the driver tends to perform the erroneous operation. When the driver has at least one of the above tendencies, the present apparatus determines whether or not the erroneous operation is performed using the relaxation erroneous operation condition that is easier to be satisfied than the normal erroneous operation condition. Therefore, the present apparatus can accurately detect the erroneous operation. Accordingly, the present apparatus can reduce a possibility that the collision control is prohibited when the driver performs the erroneous operation, and a possibility that the collision control is executed when the driver performs the acceleration override operation.

DETAILED DESCRIPTION

Figure 1:
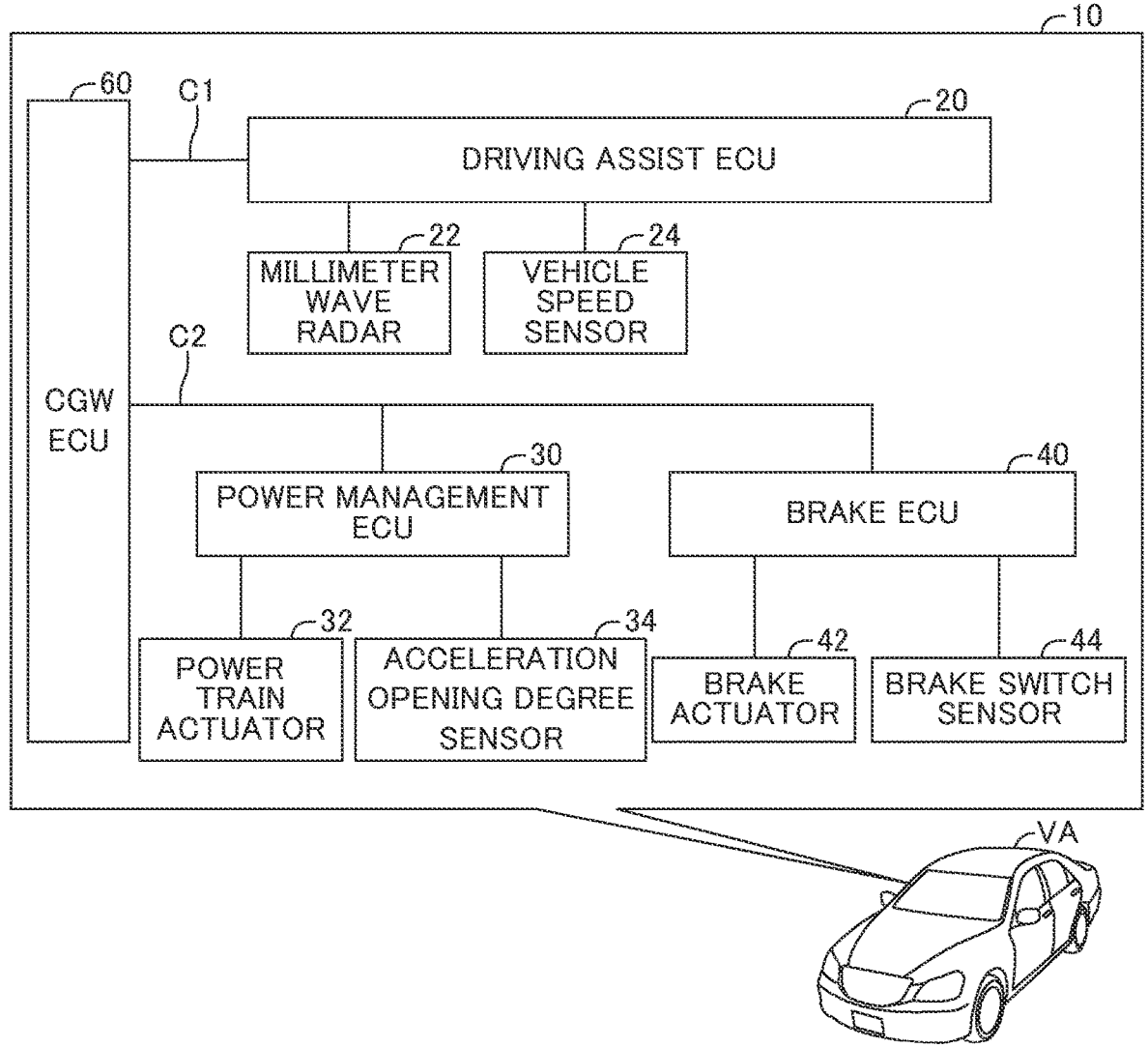
FIG. 1 is a schematic system configuration diagram of a driving support apparatus according to an embodiment of the present disclosure.

A driving support apparatus (the present support apparatus) 10 according to an embodiment of the present disclosure is applied to a vehicle VA and includes components illustrated in FIG. 1.

The driving support ECU 20 is an ECU that executes a driving support control which is a kind of automatic driving controls. Hereinafter, the driving support ECU 20 is referred to as "ECU20".

In the present specification, an "ECU" is an electronic control unit including a microcomputer as a main part. The ECU is referred to as a controller and a computer. The microcomputer includes a CPU (a processor), a ROM, a RAM, an interfaces, and the like. Some or all of the ECU20 and the plurality of ECUs described below may be integrated into one ECU.

A millimeter wave radar 22 is installed at a front end portion of the vehicle VA. The millimeter wave radar 22 detects an object existing in front of the vehicle VA so as to transmit object information related to the object to the ECU20. Specifically, the millimeter wave radar 22 uses the millimeter wave to specify a "position of the object with respect to the vehicle VA" and a "relative speed Vr of the object with respect to the vehicle VA". The millimeter wave radar 22 transmits the object information including information about the position and the speed of the object to the ECU20.

A vehicle speed sensor 24 detects a speed of the vehicle VA (a vehicle speed Vs). The ECU20 receives a detected value from the vehicle speed sensor 24.

A power management ECU30 is connected to a power train actuator 32. The power management ECU30 controls the power train actuator 32. The power train actuator 32 changes a driving force generated by a driving device (for example, an internal combustion engine and/or an electric motor) of the vehicle VA.

Further, the power management ECU30 is connected to the accelerator opening degree sensor 34. The accelerator opening degree sensor 34 detects an operation amount (a depression amount) AP of an accelerator pedal (an acceleration operator) (not shown) of the vehicle VA. The power management ECU30 receives a detected value from the accelerator opening sensor 34. Further, the ECU20 can obtain the detected value of the accelerator opening degree sensor 34 received by the power management ECU30.

A brake ECU40 is connected to a brake actuator 42 and controls a brake actuator 42. The brake actuator 42 controls a braking force applied to the vehicle VA.

Further, the brake ECU40 is connected to a brake switch sensor 44. The brake switch sensor 44 detects whether or not a brake pedal (a deceleration operator) (not shown) of the vehicle VA is operated. The brake ECU40 receives a detected value from the brake switch sensor 44. Further, the ECU20 can obtain the detected value of the brake switch sensor 44 received by the brake ECU40.

A CGW (control gateway) ECU60 controls transmission/reception of data between the plurality of ECUs via a first communication line C1 and a second communication line C2.

(Operation)

An operation of the ECU20 of the present support apparatus 10 will be described.

When the ECU20 determines that a possibility that the vehicle VA collide with the object is high, the ECU20 executes a collision control for avoiding the collision or mitigating (reducing) the damage caused by the collision. An example of the collision control is an automatic brake control.

The ECU20 determines that a driver has performed an acceleration override operation when an acceleration override condition described later is satisfied. In this case, the ECU20 prohibits the collision control. However, when the ECU20 determines that an acceleration operation of the driver is an erroneous operation, the ECU20 does not prohibit the collision control even if the ECU20 determines that the driver has performed the acceleration override operation.

The ECU20 determines that the acceleration operation is the erroneous operation when a normal erroneous operation condition described later is satisfied. Even if the normal erroneous operation condition is not satisfied, when a relaxation condition is satisfied, the ECU20 determines whether or not a relaxation erroneous operation condition is satisfied. The relaxation erroneous condition is easier to be satisfied than the normal erroneous operation condition. The ECU20 determines that the acceleration operation is the erroneous operation when the relaxation erroneous operation condition is satisfied.

When any one of the above conditions 1 and 2 is satisfied, the ECU20 determines that the relaxation condition is satisfied.

When the condition 1 is satisfied, the driver has a "tendency to perform the erroneous operation that increases a collision possibility that the vehicle VA collides with the object". When the condition 2 is satisfied, the driver has a tendency to perform the erroneous operation. When the driver has any one of the above tendencies, the ECU20 determines whether or not the driver has performed the erroneous operation using the relaxation erroneous operation condition that is easier to be satisfied than the normal erroneous operation condition. Accordingly, when the driver does not have the above tendencies, the ECU20 determines whether or not the driver has performed the erroneous operation using the normal erroneous operation condition that is more difficult to be satisfied than the relaxation erroneous operation condition. When the driver has any one of the above tendencies, the ECU20 determines whether or not the driver has the erroneous operation using the relaxed erroneous operation condition that is easier to be satisfied than the normal erroneous operation condition. Therefore, since the determination of the erroneous operation is performed using the condition corresponding to the tendency of the driver, the present support apparatus 10 can accurately detect the erroneous operation. Accordingly, the present support apparatus 10 can reduce the possibility of prohibiting the collision control despite the driver performing the erroneous operation and the possibility of executing the collision control despite the driver performing the acceleration override operation.

(Specific Operation)

A CPU of the ECU20 is executed every time a predetermined period of time elapses in the routines illustrated by the flow charts in FIGS. 2 to 5.

<Collision Control Routine>

Figure 2:
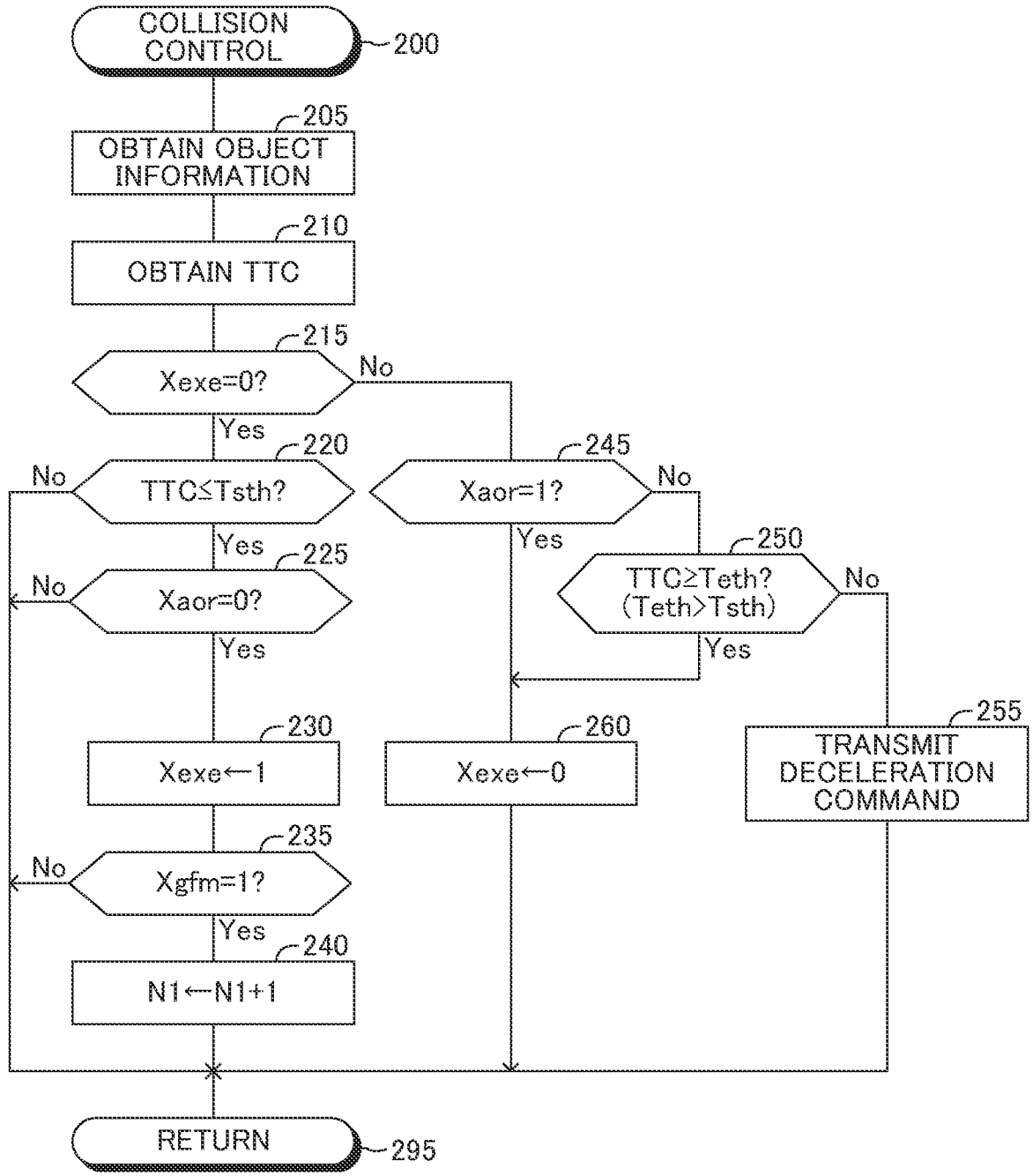
FIG. 2 is a flowchart of a program executed by a CPU of a driving support ECU.

When an appropriate time point comes, the CPU starts processing from step 200 of FIG. 2 and executes steps 205 to 215 in sequence.

Step 205: The CPU obtains the object information from the millimeter wave radar 22.

Step 210: The CPU obtains a TTC (Time To Collision) based on the object information. The TTC represents how long it takes for the vehicle VA to collide with the object. The TTC is also referred to as a "collision required time", a "collision grace time", and the like. The CPU obtains a distance between the vehicle VA and the object based on the position of the object specified based on the object information. The CPU obtains the TTC by dividing the distance by the relative speed Vr.

Step 215: The CPU determines whether or not an execution flag Xexe is "0".

When the CPU executes the collision control, a value of the execution flag Xexe is set to "1", and when the CPU does not execute the collision control, the value of the execution flag Xexe is set to "0". The execution flag Xexe is also set to "0" in an initialization routine. The initialization routine is a routine executed by the CPU when an ignition-key switch (not shown) of the vehicle VA is changed from an off-position to an on-position.

When the execution flag Xexe is "0" (step 215: Yes), the process proceeds to step 220. In step 220, the CPU determines whether or not the TTC is shorter than or equal to a threshold start time Tsth.

When the TTC is longer than the threshold start time Tsth (step 220: No), the CPU determines that the collision possibility that the vehicle VA collides with the object is low. Then, the process proceeds to step 295, and the CPU terminates the present routine tentatively.

When the TTC is shorter than or equal to the threshold start time Tsth (step 220: Yes), the CPU determines that the collision possibility that the vehicle VA collides with the object is high. The process proceeds to step 225. In step 225, the CPU determines whether or not an acceleration override flag Xaor is "0".

When the CPU determines that the driver has performed the acceleration override operation, a value of the acceleration override flag Xaor is set to "1", and when the CPU determines that the driver has not performed the acceleration override operation, the value of the acceleration override flag Xaor is set to "0". The acceleration override flag Xaor is also set to "0" in the initialization routine.

When at least one of a condition that the operation amount AP is equal to or greater than a first start threshold AP1orth and a condition that the operation amount AP is equal to or greater than a second start threshold AP2orth and an operation speed APV is equal to or greater than a first threshold speed APV1th is satisfied (that is, when the acceleration override condition is satisfied), the CPU determines that the driver has performed the acceleration override operation so as to set the acceleration override flag Xaor to "1". However, the CPU does not set the acceleration override flag Xaor to "1" (that is, the CPU does not prohibit the collision control) even if the acceleration override condition is satisfied when the CPU determines that the acceleration operation is an erroneous operation (that is, when an erroneous operation flag Xgfm described later is set to "1"). The operation speed APV represents an operation speed of the accelerator pedal. The operation speed APV is obtained by time-differentiating the operation amount AP.

The second start threshold AP2orth is set to be smaller than the first start threshold AP1orth.

On the other hand, when a condition that the operation amount AP is equal to or less than an OR end threshold AP3orth is satisfied, the CPU determines that the driver is no longer performing the acceleration override operation. The OR end threshold AP3orth is set to be smaller than the second start threshold AP2orth.

When the acceleration override flag Xaor is "0" (step 225: Yes), the CPU executes step 230 and step 235 in sequence.

Step 230: The CPU sets the execution flag Xexe to "1".

Step 235: The CPU determines whether or not the erroneous operation flag Xgfm is "1".

When the CPU determines that the acceleration operation of the driver is the erroneous operation, the value of the erroneous operation flag Xgfm is set to "1", and when CPU determines that the acceleration operation of the driver is not an erroneous operation, the value of the erroneous operation flag Xgfm is set to "0". The error operation flag Xgfm is also set to "0" in the initial routine.

When the erroneous operation flag Xgfm is "0" (step 235: No), the process proceeds to step 295, and the CPU terminates the present routine tentatively.

When the erroneous operation flag Xgfm is "1" (step 235: Yes), the process proceeds to step 240, and the CPU adds "1" to a first numbers-of-executions counter N1. After that, the process proceeds to step 295, and the CPU terminates the present routine tentatively.

The first numbers-of-executions counter N1 is a counter for counting the number of times the collision control is executed while the CPU determines that the acceleration operation of the driver is the erroneous operation in one trip. At the beginning of one trip (i.e., in the initialization routine), the first execution number counter N1 is set to "0".

In a case where the acceleration override Xaor is "1" when the process proceeds to step 225 (step 225: No), the process proceeds to step 295 and the CPU terminates the routine tentatively. Therefore, when the CPU determines that the driver is performing the acceleration override operation before the CPU starts the collision control, the CPU does not start the collision control (that is, the CPU prohibits the collision control).

In a case where the execution flag Xexe is "1" when the process proceeds to step 215 (step 215: No), the process proceeds to step 245. In step 245, the CPU determines whether or not the acceleration override flag Xaor is "1".

When the acceleration override flag Xaor is "0" (step 245: No), the process proceeds to step 250. In step 250, the CPU determines whether or not the TTC is longer than or equal to a threshold end time Teth. The threshold end time Teth is set to be larger than the threshold start time Tsth.

When the TTC is shorter than the threshold end time Teth (step 250: No), the process proceeds to step 255. In step 255, the CPU transmits a deceleration command including a predetermined target deceleration Gtgt to the power management ECU30 and the braking ECU40. After that, the process proceeds to step 295, and the CPU terminates the present routine tentatively.

When the power management ECU30 and the brake ECU40 receive the deceleration command, the power management ECU30 and the brake ECU40 control the power train actuator 32 and the brake actuator 42 so that the acceleration G of the vehicle VA coincides with the target deceleration Gtgt included in the deceleration command respectively. The power management ECU30 and the braking ECU40 receive information about the vehicle speed Vs from the ECU20, and obtain the acceleration G by time differentiating the vehicle speed Vs.

In a case where the acceleration override flag Xaor is "1" when the process proceeds to step 245 (step 245: Yes), the process proceeds to step 260. In step 260, the CPU sets the execution flag Xexe to "0". After that, the process proceeds to step 295, and the CPU terminates the present routine tentatively. Therefore, when the CPU determines that the driver has performed the acceleration override operation during execution of the collision control, the CPU stops/cancelling the collision control being executed (that is, the CPU prohibits the collision control).

In a case where the TTC is longer than or equal to the threshold end time Teth (step 250: Yes) when the process proceeds to step 250, the process proceeds to step 260. In step 260, the CPU sets the execution flag Xexe to "0". After that, the process proceeds to step 295, and the CPU terminates the present routine tentatively.

<Acceleration Erroneous Determination Routine>

Figure 3:
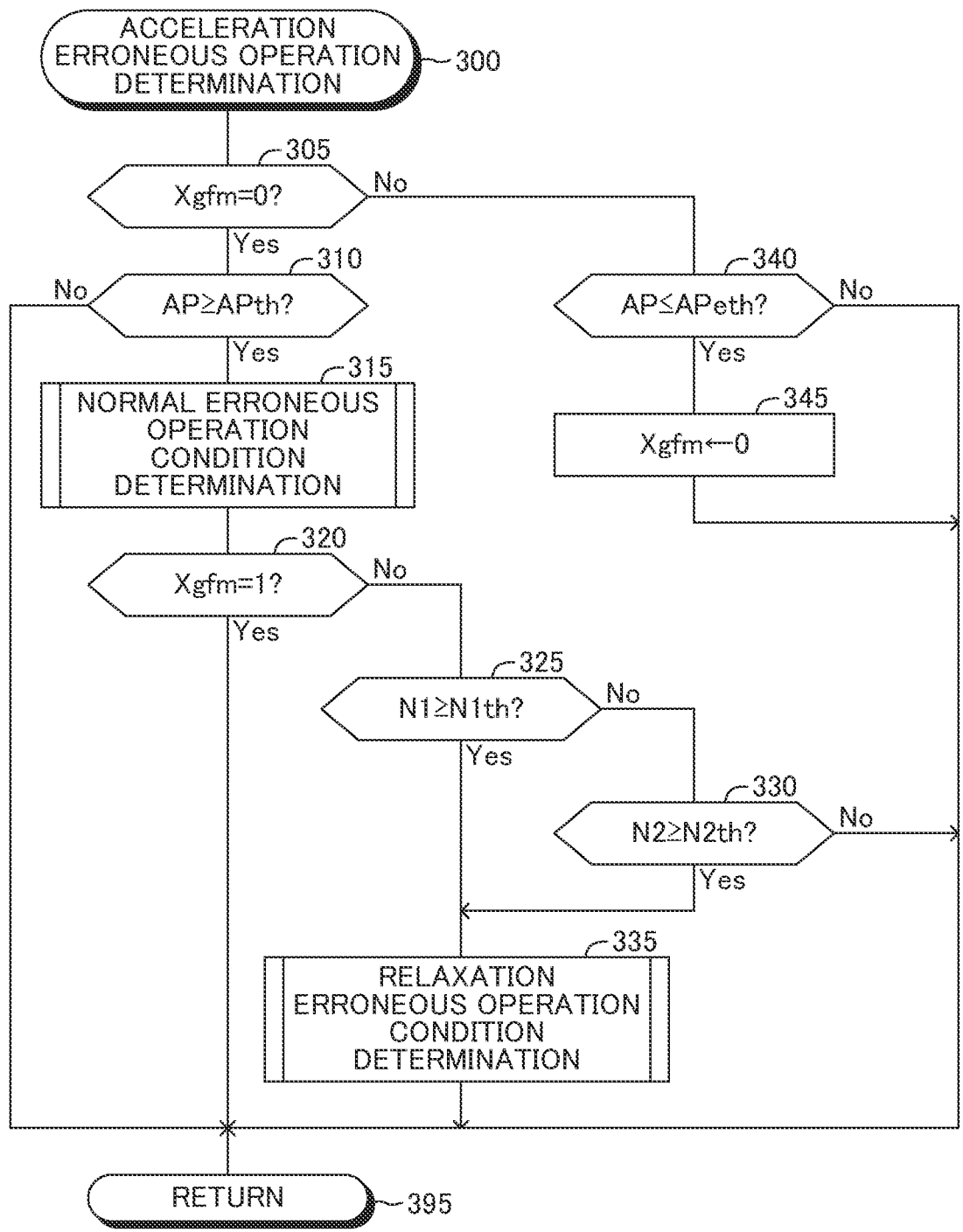
FIG. 3 is a flowchart of a program executed by the CPU of the driving support ECU.

When an appropriate time point comes, the CPU starts processing from step 300 of FIG. 3, and the process proceeds to step 305. In step 305, the CPU determines whether or not the erroneous operation flag Xgfm is "0".

When the value of the erroneous operation flag Xgfm is "0" (step 305: Yes), the process proceeds to step 310, and the CPU determines whether or not the operation amount AP is equal to or greater than a threshold operation amount APth. The threshold operation amount APth is set to a value smaller than a first erroneous operation start threshold AP1sth and a second erroneous operation start threshold AP2sth, which will be described later.

When the operation amount AP is less than the threshold operation amount APth (step 310: No), the process proceeds to step 395. In step 395, the CPU terminates the present routine tentatively.

When the operation amount AP is equal to or larger than the threshold operation amount APth (step 310: Yes), the CPU executes step 315 and step 320 in sequence.

Step 315: The CPU executes a normal erroneous operation condition determination subroutine for setting the value of the erroneous operation flag Xgfm to "1" when the normal erroneous operation condition is satisfied. The normal erroneous operation condition determination subroutine will be described later with reference to FIG. 4.

Step 320: The CPU determines whether or not the erroneous operation flag Xgfm is "1".

When the erroneous operation flag Xgfm is "0" (step 320: No), that is, when the normal erroneous operation condition is not satisfied, the process proceeds to step 325. In step 325, the CPU determines whether or not the first number-of-executions counter N1 is greater than or equal to a first threshold value N1th.

When the first number-of-executions counter N1 is less than the first threshold value N1th (step 325: No), that is, when the condition 1 is not satisfied, the process proceeds to step 330. In step 330, the CPU determines whether or not a second execution number counter N2 is greater than or equal to a second threshold value N2th. The second threshold value N2th is preferably set to be larger than the first threshold value N1th.

The second number-of-executions counter N2 is a counter for counting the number of times of determination of the erroneous operation in one trip. At the beginning of one trip (i.e., in the initialization routine), the second number-of-executions counter N2 is set to "0".

When the second number-of-executions counter N2 is less than the second threshold value N2th (step 330: No), that is, when the relaxation condition is not satisfied, the process proceeds to step 395. In step 395, the CPU terminates the present routine tentatively.

When the first number-of-executions counter N1 is equal to or larger than the first threshold value N1th (step 325: Yes) and/or the second number-of-executions counter N2 is equal to or larger than the second threshold value N2th (step 330: Yes), the CPU determines that the relaxation condition is satisfied. In this case, the process proceeds to step 335. In step 335, the CPU executes a relaxation erroneous operation condition determination subroutine. After that, the process proceeds to step 395, and the CPU terminates the present routine tentatively. This sub-routine is a routine for setting the value of the erroneous operation flag Xgfm to "1" when the "relaxation erroneous operation condition that is easier to be satisfied than the normal erroneous operation condition" is satisfied. This subroutine will be described later with reference to FIG. 5.

In a case where the erroneous operation flag Xgfm is "1" when the process proceeds to step 305 (step 305: No), the process proceeds to step 340. In step 340, the CPU determines whether or not the operation amount AP is less than or equal to an erroneous operation end threshold APeth. The erroneous operation end threshold APeth is set to be smaller than the threshold operation amount APth. The erroneous operation end threshold APeth may be set to be the same as OR end threshold AP3orth.

When the operation amount AP is greater than the erroneous operation end threshold APeth (step 340: No), the process proceeds to step 395. In step 395, the CPU terminates the present routine tentatively. When the operation amount AP is equal to or smaller than the erroneous operation end threshold APeth (step 340: Yes), the CPU sets the value of the erroneous operation flag Xgfm to "0" (that is, the CPU determines that the acceleration operation is no longer the erroneous operation). After that, the process proceeds to step 395, and the CPU terminates the present routine tentatively.

<Normal Erroneous Operation Condition Determination Subroutine>

Figure 4:
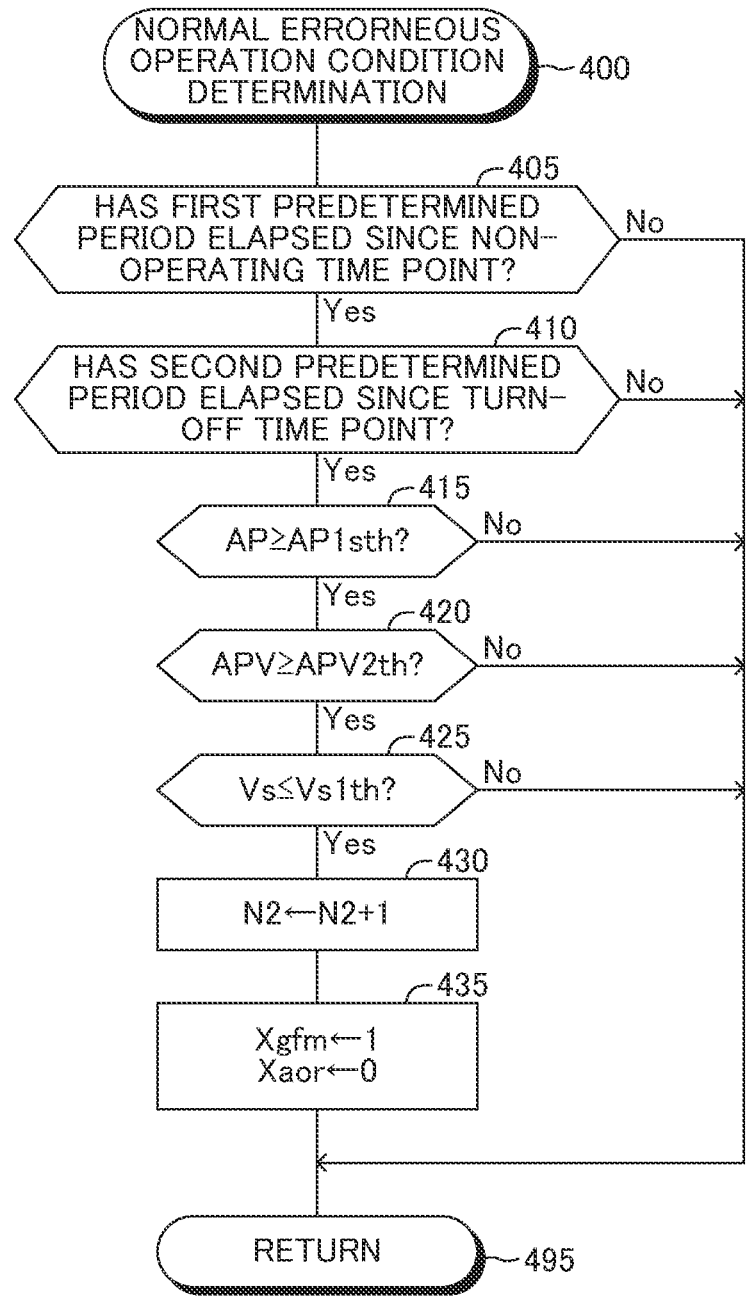
FIG. 4 is a flowchart of a program executed by the CPU of the driving support ECU.

When the process proceeds to step 315 of FIG. 3, the CPU starts processing from step 400 of FIG. 4, and the process proceeds to step 405. In step 405, the CPU determines whether or not a first predetermined period T1th has elapsed since a non-operating time point at which the brake pedal is not operated.

When the first predetermined period T1th has elapsed from the non-operating time point (step 405: Yes), the process proceeds to step 410. In step 410, the CPU determines whether or not a second predetermined period T2th has elapsed since a turn-off time point at which a blinker (not shown) is turned off.

When the second predetermined period T2th has elapsed since the turn-off time point (step 410: Yes), the process proceeds to step 415. In step 415, the CPU determines whether or not the operation amount AP is equal to or greater than the first erroneous operation start threshold AP1sth. The first erroneous operation start threshold AP1sth may be referred to as a "first threshold".

When the operation amount AP is equal to or larger than the first erroneous operation start threshold AP1sth (step 415: Yes), the process proceeds to step 420. In step 420, the CPU determines whether or not the operation speed APV is higher than or equal to the second threshold speed APV2th.

The second threshold speed APV2th is set to be lower than the first threshold speed APV1th.

When the operation speed APV is higher than or equal to the second threshold speed APV2th (step 420: Yes), the process proceeds to step 425. In step 425, the CPU determines whether or not the vehicle speed Vs is lower than or equal to a first threshold vehicle speed Vs1th.

When the vehicle speed Vs is equal to or lower than the first threshold vehicle speed Vs1th (step 425: Yes), the CPU executes step 430 and step 435 in sequence.

Step 430: The CPU adds "1" to the second number-of-executions counter N2.

Step 435: The CPU sets the value of the erroneous operation flag Xgfm to "1" and sets the value of the acceleration override flag Xaor to "0".

After that, the process proceeds to step 495, and the CPU terminates the present routine tentatively.

When the first predetermined period T1th has not yet elapsed from the non-operating time point (step 405: No), the process proceeds to step 495, and the CPU terminates the present routine tentatively. Immediately after the driver switching from the brake pedal to the accelerator pedal, a possibility that the driver erroneously operates the accelerator pedal is low, and a possibility that the driver has an acceleration intention is high. Therefore, the CPU does not determine the erroneous operation.

When the second predetermined period of T2th has not yet elapsed since the turn-off time point (step 410: No), the process proceeds to step 495, and the CPU terminates the present routine tentatively. When the vehicle VA passes the preceding vehicle, the driver is highly likely to depress the accelerator pedal largely (deeply) after the vehicle VA reaches a neighboring lane and the blinker is turned off. Therefore, when the second predetermined period of T2th has not yet elapsed since the turn-off time, the CPU does not determine the erroneous operation.

When the operation amount AP is less than the first erroneous operation start threshold AP1sth (step 415: No), when the operation speed APV is less than the second threshold speed APV2th (step 420: No), or when the vehicle speed Vs is equal to or higher than the first threshold vehicle speed Vs (step 425: No), the process proceeds to step 495, and the CPU terminates the present routine tentatively.

<Relaxation Erroneous Operation Condition Determination Subroutine>

Figure 5:
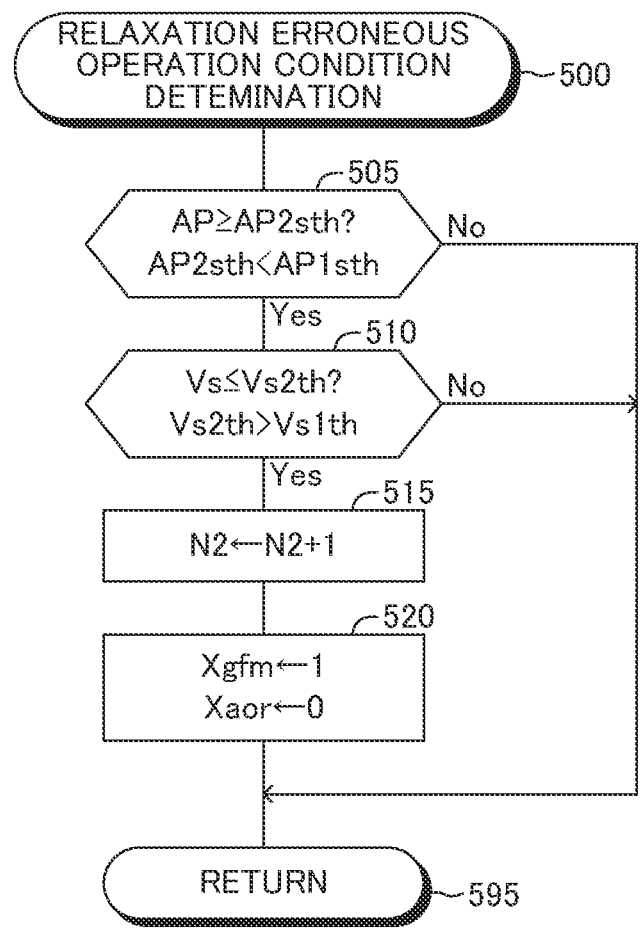
FIG. 5 is a flowchart of a program executed by the CPU of the driving support ECU.

When the process proceeds to step 335 of FIG. 3, the CPU starts processing from step 500 of FIG. 5, and the process proceeds to step 505. In step 505, the CPU determines whether or not the operation amount AP is equal to or greater than a second erroneous operation start threshold AP2sth. The second erroneous operation start threshold AP2sth is set to a value smaller than the first erroneous operation start threshold AP1sth, and may be referred to as a "second threshold".

When the operation amount AP is equal to or larger than the second erroneous operation start threshold AP2sth (step 505: Yes), the process proceeds to step 510. In step 510, CPU determines whether or not the vehicle speed Vs is lower than or equal to a second threshold vehicle speed Vs2th. The second threshold vehicle speed Vs2th is set to be larger than the first threshold vehicle speed Vs1th.

When the vehicle speed Vs is equal to or lower than the second threshold vehicle speed Vs2th (step 510: Yes), the CPU executes step 515 and step 520 in sequence. After that, the process proceeds to step 595, and the CPU terminates the present routine tentatively. Steps 515 and 520 are the same as steps 430 and 435 shown in FIG. 4, respectively, and thus description thereof will be omitted.

When the operation amount AP is less than the second erroneous operation start threshold value AP2sth (step 505: No), or when the vehicle speed Vs is greater than the second threshold vehicle speed Vs2th (step 510: No), the process proceeds to step 595, and the CPU terminates the routine tentatively.

As described above, the relaxation erroneous operation condition does not include the conditions corresponding to steps 405, 410, and 420 illustrated in FIG. 4. The second erroneous operation start threshold AP2sth is set to a value smaller than the first erroneous operation start threshold AP1sth. The second threshold vehicle speed Vs2th is set to a value higher than the first threshold vehicle speed Vs1th. Therefore, the relaxation erroneous operation condition is a condition that is easier satisfied than the normal erroneous operation condition.

The CPU determines that the relaxation condition is satisfied when the first number-of-executions counter N1 is equal to or greater than the first threshold N1th (when the condition 1 is satisfied) and/or when the second numbers-of-executions counter N2 is equal to or greater than the second threshold N2th (when the condition 2 is satisfied) so as to determine whether or not the acceleration operation is the erroneous operation using the relaxation erroneous operation condition. Accordingly, since the determination of the erroneous operation is performed using the condition corresponding to the tendency of the driver, the erroneous operation can be accurately detected.

(First Modification)

A sensor for detecting an object in front of the vehicle VA is not limited to the millimeter-wave radar 22. As an example, such a sensor may be a camera. Further, the ECU20 may detect an object in front of the vehicle VA by integrating information about the object detected by the camera and the object information obtained by the millimeter-wave radar 22.

(Second Modification)

The following condition 3 may be adopted instead of the condition 1 of the relaxation condition.

Condition 3: The number of times of execution of the collision control in one trip is equal to or greater than a first threshold number.

(Third Modification)

The collision control is not limited to the automatic braking control. As an example, the collision control may be an alert control for alerting the driver to the object having the TTC equal to or less than the threshold start time Tsth. In the alert control, the ECU20 may display an alert screen for directing the driver's eye toward the object, or may generate an alert sound.

(Fourth Modification)

The present support apparatus 10 may be applied vehicles such as an engine vehicle, a hybrid electric vehicle (HEV), a plug-in Hybrid electric vehicle (PHEV), a fuel cell electric vehicle (FCEV), and a battery electric vehicle (BEV).

The present disclosure can also be regarded as a non-transitory computer-readable storage medium storing a program for realizing the functions of the support apparatus 10. Further, the present disclosure can be applied to an automatic driving vehicle in a case where a transition from automatic driving (for example, automatic brake control) to driving of a driver is made.

What is claimed is:

1. A driving support apparatus comprising:
a sensor configured to detect an object; and
a controller configured to prohibit a collision control for avoiding a collision between a vehicle and the object or for mitigating a damage caused by the collision, when an override condition for determining that an acceleration operation of a driver is an override operation is satisfied,
wherein,
the controller is configured to:
execute the collision control without prohibiting the collision control, in a case where the override condition is satisfied while the controller is determining that the acceleration operation is an erroneous operation;
determine that the acceleration operation is the erroneous operation, when a predetermined normal erroneous operation condition is satisfied, or when a predetermined relaxation erroneous operation condition that is easier satisfied than the normal erroneous operation condition is satisfied and a predetermined relaxation condition is satisfied; and
determine that the relaxation condition is satisfied, when a number of executions of the collision control while the controller is determining that the acceleration operation is the erroneous operation in one trip is greater than or equal to a first threshold number, or when a number of determinations that the acceleration operation is the erroneous operation in one trip is greater than or equal to a second threshold number.

2. The driving support apparatus according to claim 1, wherein,
the controller is further configured to determine whether or not the normal erroneous operation condition and the relaxation erroneous operation condition by at least comparing an operation amount of the acceleration operation with a first threshold for the normal erroneous operation condition and a second threshold for the relaxation erroneous operation condition,
wherein the first threshold is preset to be greater than the second threshold.

3. The driving support apparatus according to claim 1, wherein,
the controller is configured to:
determine whether or not the normal erroneous operation condition is satisfied based on at least one of an operation amount of the acceleration operation, an operation speed of the acceleration operation, and a vehicle speed of the vehicle; and
determine whether or not the relaxation erroneous operation condition is satisfied based on at least one of the operation amount, and the vehicle speed.

4. A driving support method for prohibiting a collision control for avoiding a collision between a vehicle and an object or for mitigating a damage caused by the collision when an override condition for determining that an acceleration operation of a driver is an override operation is satisfied, the driving support method being executed by a computer installed on the vehicle, comprising:
a first step of executing the collision control without prohibiting the collision control, in a case where the override condition is satisfied while the controller is determining that the acceleration operation is an erroneous operation;
a second step of determining that the acceleration operation is the erroneous operation, when a predetermined normal erroneous operation condition is satisfied, or when a predetermined relaxation erroneous operation condition that is easier satisfied than the normal erroneous operation condition is satisfied and a predetermined relaxation condition is satisfied; and
a third step of determining that the relaxation condition is satisfied, when a number of executions of the collision control while the controller is determining that the acceleration operation is the erroneous operation in one trip is greater than or equal to a first threshold number or when a number of determinations that the acceleration operation is the erroneous operation in one trip is greater than or equal to a second threshold number.

5. A non-transitory computer-readable storage medium storing a program for causing a computer installed on a vehicle to prohibit a collision control for avoiding a collision between a vehicle and the object or for mitigating a damage caused by the collision, when an override condition for determining that an acceleration operation of a driver is an override operation is satisfied,
the program causing the computer to implement processes of:
a first step of executing the collision control without prohibiting the collision control, in a case where the override condition is satisfied while the controller is determining that the acceleration operation is an erroneous operation;
a second step of determining that the acceleration operation is the erroneous operation, when a predetermined normal erroneous operation condition is satisfied, or when a predetermined relaxation erroneous operation condition that is easier satisfied than the normal erroneous operation condition is satisfied and a predetermined relaxation condition is satisfied; and
a third determining that the relaxation condition is satisfied, when a number of executions of the collision control while the controller is determining that the acceleration operation is the erroneous operation in one trip is greater than or equal to a first threshold number or when a number of determinations that the acceleration operation is the erroneous operation in one trip is greater than or equal to a second threshold number.

* * * * *